(No Model.)
N. D. COE.
VEHICLE WHEEL.
No. 573,764. Patented Dec. 22, 1896.
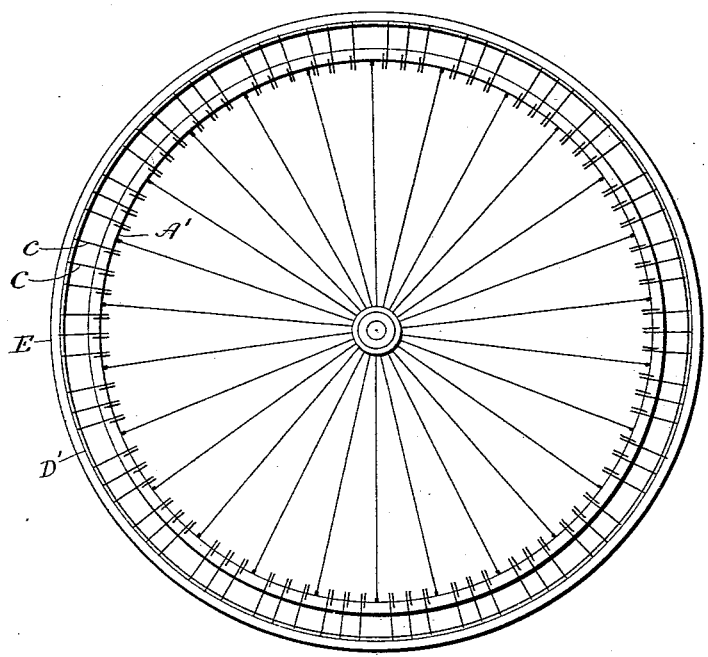
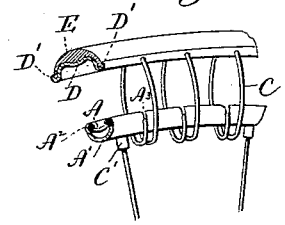
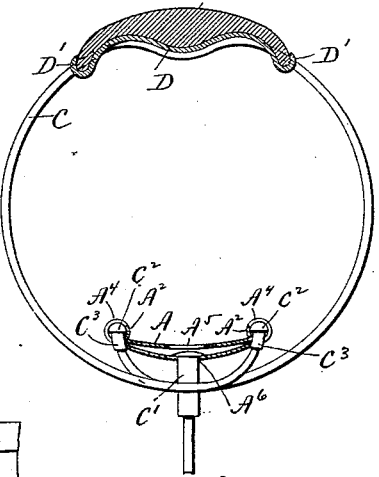
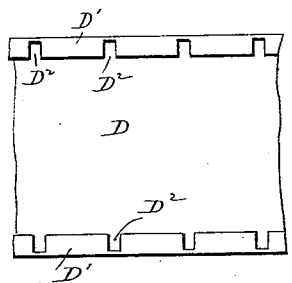
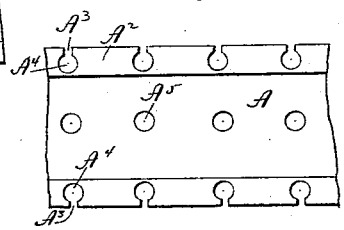
THE NORRIS PETERS CO., PHOTO-LITHO., WASHINGTON, D. C.

UNITED STATES PATENT OFFICE.

NELSON D. COE, OF NEW HAVEN, CONNECTICUT, ASSIGNOR OF ONE-THIRD TO JAMES N. COE, OF NOROTON, CONNECTICUT.

VEHICLE-WHEEL.

SPECIFICATION forming part of Letters Patent No. 573,764, dated December 22, 1896.

Application filed May 4, 1896. Serial No. 590,118. (No model.)

*To all whom it may concern:*

Be it known that I, NELSON D. COE, of New Haven, in the county of New Haven and State of Connecticut, have invented a new Improvement in Vehicle-Wheels; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a wheel constructed in accordance with my invention; Fig. 2, a broken view thereof in perspective; Fig. 3, an enlarged view of the rim and skeleton tire of the wheel in transverse section; Fig. 4, a detached broken plan view of a portion of the rim, showing the formation and arrangement of the slots in the hollow beads thereof; Fig. 5, a detached reverse broken plan view of a portion of the tread, showing the slots formed in the beads thereof.

My invention relates to an improvement in that class of vehicle-wheels in which the place of a continuous tubular tire, such as a rubber tube, is taken by a skeleton tire composed of a series of radially-arranged circular wire springs interposed between a suitable tread and a wheel-rim, the object being to produce a light, durable, and extremely resilient construction.

With these ends in view my invention consists in a vehicle-wheel having certain details of construction and combinations of parts, as will be hereinafter described, and pointed out in the claims.

In carrying out my invention I employ, as herein shown, a hollow wheel-rim comprising an outer member A and an inner member A', the latter being wider than the former and having its edges turned outward and inward to connect the two members and to form upon the respective edges of the rim two outwardly-projecting hollow beads $A^2$ $A^2$, which stiffen the rim and provide for the attachment of the circular springs C to it. For this purpose the said beads are formed with slots $A^3$, regularly spaced, located opposite each other, and entering the outer edges of the beads so as to open laterally outward. The outer ends of the slots are extended inward and enlarged, as at $A^4$, so as to open radially, or directly outward, as shown in Fig. 5. The outer member A of the rim is formed in the usual manner with clearance-holes $A^5$, which permit the nipples C' of the spokes to be inserted into the nipple-receiving holes $A^6$, formed in the inner member of the rim. The said springs are made of tempered wire and are substantially circular in form. Their ends cross each other within the circle of the rim, as clearly shown in Figs. 2 and 3, and extend beyond each other in opposite directions and then outward on opposite sides of the rim in positions to permit them to be engaged with the hollow beads thereof. To adapt the said ends of the springs to be connected with the said beads, they are formed with heads consisting of buttons $C^2$ and shanks $C^3$, which will pass through the enlarged outer ends $A^4$ of the slots $A^3$ in the beads, but not through the slots proper.

To connect the springs with the rim, their crossed inner ends are applied to the beads so that the shanks of their heads will project beyond the outer faces thereof. The said ends are then forced laterally inward into the slots in the beads until their shanks and heads are alined with the enlarged inner ends of the slots, into which the headed ends of the springs will not pass so as to enter into the beads, with which the springs are thus connected. In the use of the wheel the thrusts of the headed ends of the springs are, in the main, laterally outward, and therefore will not disengage the headed ends of the springs from the beads, as that can only be done by forcing the said ends of the beads radially outward until the shanks of the heads are entirely cleared from the enlarged inner ends of the slots.

The outer portions of the springs are spaced and held together by means of a thin sheet-metal tread D, which is bowed in cross-section, as clearly shown in Fig. 3, and has its edges turned outward and inward to form two tubular beads D' D', which are constructed at opposite points and regular intervals with inwardly-opening transverse slots $D^2$ $D^2$, receiving the outer portions of the springs.

The said springs are held in the notches by the tension between them and the tread, which is made so as to slightly compress them and put them under sufficient tension to hold it in place. It will be observed by reference to Fig. 3 that the outer portions of the springs are curved inwardly, so as to conform to the bowed cross-section of the sheet-metal tread. It will also be observed by reference to the same figure that the cushion has its inner face shaped to conform to the cross-sectional curvature of the tread, and its outer face convexed, so as to conform to the general curvature of the springs, although it does not conform to their curvature exactly, as it is struck on a larger circle. I may also note that the tread is thus connected with the springs by its edges and on opposite sides of the plane of the wheel. The outer face of the tread is encircled by a rubber cushion E, the edges of which are held in place by the outwardly and inwardly turned edges of the tread D, as shown in Fig. 3. This cushion may be said to be substantially crescent-shaped in cross-section, though it is not quite concavo-convex.

It will be seen from the foregoing that the springs and tread combine to form what I may term a "skeleton" tire, the same being very light and unusually resilient.

It is apparent that in carrying out my invention some changes from the construction herein shown and described may be made, and I would therefore have it understood that I do not limit myself to the same, but hold myself at liberty to make such changes and alterations as fairly fall within the spirit and scope of my invention.

Having fully described my invention, what I claim as new, and desire to secure by Letters Patent, is—

1. In a vehicle-wheel, the combination with the rim thereof, of a series of independently-formed, radially-arranged, substantially circular wire springs having their ends independently connected with the said rim, a sheet-metal tread applied to the outer portion of the said springs, and having its opposite edges connected therewith at points on opposite sides of the plane of the wheel, and a rubber cushion applied to the outer face of the tread and adapted to substantially cover the same.

2. In a vehicle-wheel, the combination with a rim having slotted hollow beads formed upon its opposite edges, of a series of radially-arranged wire springs, having their ends crossed within the rim, and extended in opposite directions, and bent outward and furnished at their ends with heads which are entered into the said hollow beads through the slots therein, a tread applied to the outer portion of the springs, and a cushion applied to the tread, substantially as described.

3. In a vehicle-wheel, the combination with a rim having hollow beads formed upon its opposite edges, the said beads constructed with slots entering their outer edges so as to open laterally outward and having their outer ends extended inward and enlarged so as to open radially or directly outward; of a series of radially-arranged wire springs having their ends crossed within the rim and extended in opposite directions, and bent outward and furnished at their ends with heads comprising buttons and shanks and entered into the said hollow beads through the slots therein, for coupling the springs with the rim; a tread applied to the outer portion of the springs, and a cushion applied to the tread.

4. In a vehicle-wheel, the combination with the rim thereof, of a series of radially-arranged wire springs applied to the said rim, a sheet-metal tread having its edges folded to form hollow beads which are slotted at regular intervals to receive the outer portions of the springs which are engaged on opposite sides of the plane of the wheel, and a substantially crescent-shaped cushion applied to the outer surface of the tread.

5. In a vehicle-wheel, the combination with the rim thereof, of a series of independently-formed, radially-arranged, substantially circular wire springs, having their ends independently connected with the said rim, and their outer portions curved inwardly, a sheet-metal tread of bowed cross-section, applied to the inwardly-curved outer portion of the springs, and a rubber cushion applied to the outer face of the tread which it substantially covers.

6. In a vehicle-wheel, the combination with the rim thereof, of a series of radially-arranged, substantially circular wire springs connected with the said rim, a sheet-metal tread of bowed cross-section, having its edges turned outward and inward to form hollow beads which are slotted at regular intervals to receive the outer portion of the springs with which the tread is connected on opposite sides of the plane of the wheel, and a substantially crescent-shaped cushion applied to the outer surface of the tread, and having its edges inserted into the said beads.

7. In a vehicle-wheel, the combination with the rim thereof, of a series of independently-formed, radially-arranged, substantially circular wire springs, having their ends independently connected to the said rim, a sheet-metal tread having its edges turned outward and inward to form hollow beads which are slotted at regular intervals to receive the outer portion of the springs with which the tread is connected on opposite sides of the plane of the wheel, and a cushion applied to the outer surface of the tread, and having its edges inserted into the said beads.

8. In a vehicle-wheel, the combination with a rim having slotted hollow beads formed upon its opposite edges, of a series of radially-arranged, substantially circular wire springs connected with the said rim, a sheet-metal tread having its edges folded to form hollow beads which are slotted at regular intervals to receive the outer portion of the springs to which the tread is connected by its edges on opposite sides of the plane of the wheel, and a substantially crescent-shaped cushion applied to the outer surface of the tread.

In testimony whereof I have signed this specification in the presence of two subscribing witnesses.

NELSON D. COE.

Witnesses:
   FRED. C. EARLE,
   LILLIAN D. KELSEY.